(12) United States Patent
Burmeister et al.

(10) Patent No.: US 10,188,990 B2
(45) Date of Patent: Jan. 29, 2019

(54) DEVICE AND METHOD FOR POSITIONING A DETONATOR WITHIN A PERFORATING GUN ASSEMBLY

(71) Applicants: DynaEnergetics GmbH & Co. KG, Troisdorf (DE); DynaEnergetics US, Inc., Boulder, CO (US)

(72) Inventors: Gernot Uwe Burmeister, Austin, TX (US); Thomas Keller Bradfield, Austin, TX (US); Christian Eitschberger, Munich (DE); Frank Haron Preiss, Bonn (DE); Thilo Scharf, Letterkenny (IE); Liam McNelis, Bonn (DE)

(73) Assignees: DynaEnergetics GmbH & Co. KG, Troisdorf (DE); DynaEnergetics US, Inc., Boulder, CO (US)

( * ) Notice: Subject to any disclaimer, the term of this patent is extended or adjusted under 35 U.S.C. 154(b) by 0 days.

(21) Appl. No.: 15/117,228

(22) PCT Filed: Mar. 5, 2015

(86) PCT No.: PCT/US2015/018906
§ 371 (c)(1),
(2) Date: Aug. 8, 2016

(87) PCT Pub. No.: WO2015/134719
PCT Pub. Date: Sep. 11, 2015

(65) Prior Publication Data
US 2016/0356132 A1    Dec. 8, 2016

Related U.S. Application Data

(60) Provisional application No. 61/949,939, filed on Mar. 7, 2014.

(51) Int. Cl.
*B01D 65/08* (2006.01)
*B01D 61/20* (2006.01)
(Continued)

(52) U.S. Cl.
CPC ............. *B01D 65/08* (2013.01); *B01D 61/20* (2013.01); *B01D 63/021* (2013.01);
(Continued)

(58) Field of Classification Search
CPC ...... E21B 43/11; E21B 43/116; E21B 43/117; E21B 43/1185; E21B 43/119; F42B 3/103;
(Continued)

(56) References Cited

U.S. PATENT DOCUMENTS 2,358,466 A * 9/1944 Miller ..................... E21B 41/00
166/178
2,889,775 A * 6/1959 Owen ................... E21B 43/117
102/310
(Continued)

FOREIGN PATENT DOCUMENTS

CA    2821506 A1    1/2015
CN    85107897 A    9/1986
(Continued)

OTHER PUBLICATIONS

U.S. Appl. No. 14/932,865, Inventors: Frank Haron Preiss, Thilo Scharf, and Liam McNelis, filed Nov. 4, 2015.
(Continued)

*Primary Examiner* — Stephen Johnson
*Assistant Examiner* — Benjamin S Gomberg
(74) *Attorney, Agent, or Firm* — Moyles IP, LLC

(57) ABSTRACT

According to an aspect, a detonator positioning device is provided for use with a wireless detonator in a perforating gun assembly. The detonator positioning device includes a
(Continued)

single mechanism for physical electrical connection, while the remaining electrical connections are made via electrically contactable components. A method of assembling the perforating gun assembly is also provided, including a detonator positioning device configured to receive and hold the wireless detonator.

16 Claims, 7 Drawing Sheets

(51) Int. Cl.
*B01D 63/02* (2006.01)
*B01D 63/04* (2006.01)
*B01D 65/00* (2006.01)
*E21B 43/117* (2006.01)
*E21B 43/119* (2006.01)

(52) U.S. Cl.
CPC ........... *B01D 63/046* (2013.01); *B01D 65/00* (2013.01); *E21B 43/117* (2013.01); *E21B 43/119* (2013.01); *B01D 2313/02* (2013.01); *B01D 2313/025* (2013.01); *B01D 2313/20* (2013.01); *B01D 2313/21* (2013.01); *B01D 2313/26* (2013.01); *B01D 2313/44* (2013.01); *B01D 2313/54* (2013.01); *B01D 2313/56* (2013.01); *B01D 2315/06* (2013.01); *B01D 2317/04* (2013.01); *B01D 2321/185* (2013.01)

(58) Field of Classification Search
CPC ..... F42B 3/26; F42D 1/00; F42D 1/02; F42D 1/04; F42D 1/041; F42D 1/043; F42D 1/022
USPC .......... 89/1.15–1.151; 102/275.12, 301, 313, 102/314, 321, 331
See application file for complete search history.

(56) References Cited

U.S. PATENT DOCUMENTS

| | | | | |
|---|---|---|---|---|
| 3,170,400 | A * | 2/1965 | Groff | F42B 3/26 102/332 |
| 3,246,707 | A * | 4/1966 | Bell | E21B 43/117 175/4.54 |
| 3,374,735 | A * | 3/1968 | Moore | E21B 47/09 102/313 |
| 3,504,723 | A | 4/1970 | Cushman et al. | |
| 3,859,921 | A * | 1/1975 | Stephenson | F42B 3/26 102/202.5 |
| 4,007,790 | A * | 2/1977 | Henning | E21B 31/1075 166/178 |
| 4,058,061 | A | 11/1977 | Mansur, Jr. et al. | |
| 4,182,216 | A | 1/1980 | DeCaro | |
| 4,491,185 | A * | 1/1985 | McClure | E21B 43/116 102/204 |
| 4,496,008 | A | 1/1985 | Pottier et al. | |
| 4,574,892 | A * | 3/1986 | Grigar | E21B 43/11855 166/113 |
| 4,598,775 | A | 7/1986 | Vann et al. | |
| 4,747,201 | A | 5/1988 | Donovan et al. | |
| 4,776,393 | A * | 10/1988 | Forehand | E21B 17/06 166/377 |
| 4,790,383 | A | 12/1988 | Savage et al. | |
| 4,889,183 | A | 12/1989 | Sommers et al. | |
| 5,027,708 | A | 7/1991 | Gonzalez et al. | |
| 5,052,489 | A * | 10/1991 | Carisella | E21B 43/1185 166/297 |
| 5,088,413 | A | 2/1992 | Huber et al. | |
| 5,105,742 | A | 4/1992 | Sumner | |
| 5,159,145 | A * | 10/1992 | Carisella | E21B 43/1185 102/222 |
| 5,322,019 | A * | 6/1994 | Hyland | E21B 29/02 102/201 |
| 5,347,929 | A | 9/1994 | Lerche et al. | |
| 5,436,791 | A * | 7/1995 | Turano | E21B 43/1185 102/218 |
| 5,703,319 | A * | 12/1997 | Fritz | C06C 5/06 102/275.12 |
| 5,775,426 | A | 7/1998 | Snider et al. | |
| 5,816,343 | A | 10/1998 | Markel et al. | |
| 6,006,833 | A | 12/1999 | Burleson et al. | |
| 6,012,525 | A * | 1/2000 | Burleson | E21B 17/1014 166/297 |
| 6,085,659 | A | 7/2000 | Beukes et al. | |
| 6,112,666 | A * | 9/2000 | Murray | F42D 1/043 102/275.12 |
| 6,305,287 | B1 * | 10/2001 | Capers | C06C 5/06 102/275.11 |
| 6,354,374 | B1 * | 3/2002 | Edwards | E21B 17/05 166/297 |
| 6,418,853 | B1 | 7/2002 | Duguet et al. | |
| 6,651,747 | B2 * | 11/2003 | Chen | E21B 23/01 166/212 |
| 6,739,265 | B1 * | 5/2004 | Badger | F42B 1/00 102/275.11 |
| 6,742,602 | B2 * | 6/2004 | Trotechaud | E21B 43/1185 175/4.54 |
| 7,193,527 | B2 | 3/2007 | Hall et al. | |
| 7,278,491 | B2 | 10/2007 | Scott | |
| 7,347,278 | B2 | 3/2008 | Lerche et al. | |
| 7,568,429 | B2 | 8/2009 | Hummel et al. | |
| 7,762,172 | B2 | 7/2010 | Li et al. | |
| 7,762,351 | B2 | 7/2010 | Vidal | |
| 7,778,006 | B2 | 8/2010 | Stewart et al. | |
| 7,810,430 | B2 | 10/2010 | Chan et al. | |
| 7,908,970 | B1 * | 3/2011 | Jakaboski | F42B 33/06 102/306 |
| 7,929,270 | B2 | 4/2011 | Hummel et al. | |
| 8,066,083 | B2 | 11/2011 | Hales et al. | |
| 8,069,789 | B2 | 12/2011 | Hummel et al. | |
| 8,074,737 | B2 | 12/2011 | Hill et al. | |
| 8,157,022 | B2 | 4/2012 | Bertoja et al. | |
| 8,182,212 | B2 | 5/2012 | Parcell | |
| 8,256,337 | B2 | 9/2012 | Hill et al. | |
| 8,395,878 | B2 | 3/2013 | Stewart et al. | |
| 8,875,787 | B2 * | 11/2014 | Tassaroli | E21B 43/1185 166/297 |
| 8,881,816 | B2 | 11/2014 | Glenn et al. | |
| 9,494,021 | B2 * | 11/2016 | Parks | E21B 43/117 |
| 9,581,422 | B2 | 2/2017 | Preiss et al. | |
| 9,605,937 | B2 * | 3/2017 | Eitschberger | F42C 19/12 |
| 9,689,223 | B2 | 6/2017 | Schacherer et al. | |
| 2002/0020320 | A1 | 2/2002 | Lebaudy et al. | |
| 2002/0062991 | A1 | 5/2002 | Farrant et al. | |
| 2003/0000411 | A1 | 1/2003 | Cernocky et al. | |
| 2003/0001753 | A1 | 1/2003 | Cernocky et al. | |
| 2005/0178282 | A1 | 8/2005 | Brooks et al. | |
| 2005/0194146 | A1 | 9/2005 | Barker et al. | |
| 2007/0158071 | A1 | 7/2007 | Mooney, Jr. et al. | |
| 2008/0149338 | A1 | 6/2008 | Goodman et al. | |
| 2008/0173204 | A1 | 7/2008 | Anderson et al. | |
| 2008/0264639 | A1 | 10/2008 | Parrott et al. | |
| 2009/0050322 | A1 | 2/2009 | Hill et al. | |
| 2010/0230104 | A1 | 9/2010 | Nolke et al. | |
| 2012/0199031 | A1 | 8/2012 | Lanclos | |
| 2012/0242135 | A1 | 9/2012 | Thomson et al. | |
| 2012/0247769 | A1 | 10/2012 | Schacherer et al. | |
| 2012/0247771 | A1 | 10/2012 | Black et al. | |
| 2012/0298361 | A1 | 11/2012 | Sampson | |
| 2013/0008639 | A1 | 1/2013 | Tassaroli | |
| 2013/0118342 | A1 | 5/2013 | Tassaroli | |
| 2015/0226044 | A1 | 8/2015 | Ursi et al. | |
| 2016/0061572 | A1 | 3/2016 | Eitschberger et al. | |
| 2016/0168961 | A1 | 6/2016 | Parks et al. | |

FOREIGN PATENT DOCUMENTS

| | | |
|---|---|---|
| CN | 101397890 A | 4/2009 |
| CN | 201620848 U | 11/2010 |

(56) References Cited

FOREIGN PATENT DOCUMENTS

| RU | 2633904 C1 | 10/2017 |
|---|---|---|
| WO | WO-0159401 A1 | 8/2001 |
| WO | WO-2009091422 A1 | 7/2009 |
| WO | WO-2015006869 A1 | 1/2015 |
| WO | WO2015/028204 A2 | 3/2015 |

OTHER PUBLICATIONS

DynaEnergetics, Selective Perforating Switch, Product Information Sheet, May 27, 2011, 1 pg., www.dynaenergetics.com.
PCT Written Opinion, dated Oct. 9, 2014; See Search Report for PCT Application No. PCT/CA2014/050673, which is in the same family as U.S. Pat. No. 9,494,021, 4 pgs.
German Patent Office, Office Action for DE Patent App. No. 10 2013109227.6, which is in the same family as U.S. Pat. No. 9,581,422, in German, pp. 5 & 7—list of references cited, 8 pgs.
PCT Search Report and Written Opinion, dated May 4, 2015: for PCT Appl. No. PCT/EP2014/065752, which is in the same family as U.S. Pat. No. 9,605,937, 12 pgs.
DynaEnergetics, Selective Perforating Switch, information downloaded from website, http:www.dynaenergetics.com/, Jul. 3, 2013, 2 pgs.
International Search Report of International Application No. PCT/CA2014/050673,which is in the same family as U.S. Pat. No. 9,494,021, dated Oct. 9, 2014, 3 pgs.
Hunting Titan, Wireline Top Fire Detonator Systems, Nov. 24, 2014, 1pg., http: www.hunting-intl.com/titan/perforating-guns-and-setting-tools/wireline-top-fire-detonator-systems.
UK Examination Report of United Kingdom Patent Application No. GB1600085.3, which is in the same family as U.S. Pat. No. 9,494,021, dated Mar. 9, 2016, 1 pg.
SIPO, Search Report dated Mar. 29, 2017, in Chinese: See Search Report for CN App. No. 201480040456.9, which is in the same family as U.S. Pat. No. 9,494,021, 15 pgs.
GB Intellectual Property Office, Search Report dated Jul. 7, 2017, See Office Action for App. No. GB 1700625.5, which is in the same family as WO 2015/006869, 5 pgs.
SIPO, Office Action dated Jun. 27, 2018: See Office Action for CN App. No. 201580011132.7, which is in the same family as PCT App. No. PCT/US2015/018906, 5 pgs & 9 pgs.
Norwegan Industrial Property Office, Office Action for NO Patent App. No. 20160017, which is in the same family as U.S. Pat. No. 9,494,021, dated Jun. 15, 2017, 3 pgs.
Norwegan Industrial Property Office, Search Report for NO Patent App. No. 20160017, which is in the same family as U.S. Pat. No. 9,494,021, dated Jun. 15, 2017, 2 pgs.
FIIP, Search Report dated Feb. 1, 2018, in Russian: See Search Report for RU App. No. 2016104882/03, which is in the same family as U.S. Pat. No. 9,494,021, 11 pgs.
GB Intellectual Property Office, Office Action dated Feb. 27, 2018, See Office Action for App. No. GB 1717516.7, which is in the same family as U.S. Pat. No. 9,494,021, 6 pgs.
DynaEnergetics, Selective Perforating Switch, Product summary-from website, http:www.dynaenergetics.com/, Jul. 3, 2013, 2 pgs.
DynaEnergetics, Gun Assembly, Proucts Summary Sheet, May 7, 2004.
DynaEnergetics, DYNAselect Electronic Detonator 0015 SFDE RDX 1.4B, Product Information, Dec. 16, 2011.
DynaEnergetics, DYNAselect Electronic Detonator 0015 SFDE RDX 1.4S, Product Information, Dec. 16, 2011.
DynaEnergetics, Electronic Top Fire Detonator, Product Information Sheet, Jul. 30, 2013, www.dynaenergetics.com.

* cited by examiner

DEVICE AND METHOD FOR POSITIONING A DETONATOR WITHIN A PERFORATING GUN ASSEMBLY

CROSS-REFERENCE TO RELATED APPLICATIONS

This application claims priority to PCT Application No. PCT/US2015/018906 filed Mar. 5, 2015, which claims the benefit of U.S. Provisional Application No. 61/949,939 filed Mar. 7, 2014, each of which is incorporated herein by reference in its entirety.

FIELD

A device and method for positioning a detonator within a perforating gun assembly is generally described.

BACKGROUND

Hydrocarbons, such as fossil fuels (e.g. oil) and natural gas, are extracted from underground wellbores extending deeply below the surface using complex machinery and explosive devices. Once the wellbore is established by placement of cases after drilling, a perforating gun assembly, or train or string of multiple perforating gun assemblies, are lowered into the wellbore, and positioned adjacent one or more hydrocarbon reservoirs in underground formations. The perforating gun has explosive charges, typically shaped, hollow or projectile charges, which are ignited to create holes in the casing and to blast through the formation so that the hydrocarbons can flow through the casing. Once the perforating gun(s) is properly positioned, a surface signal actuates an ignition of a fuse, which in turn initiates a detonating cord, which detonates the shaped charges to penetrate/perforate the casing and thereby allow formation fluids to flow through the perforations thus formed and into a production string. The surface signal typically travels from the surface along electrical wires that run from the surface to one or more detonators positioned within the perforating gun assembly.

Assembly of a perforating gun requires assembly of multiple parts, which typically include at least the following components: a housing or outer gun barrel within which is positioned an electrical wire for communicating from the surface to initiate ignition, a percussion initiator and/or a detonator, a detonating cord, one or more charges which are held in an inner tube, strip or carrying device and, where necessary, one or more boosters. Assembly typically includes threaded insertion of one component into another by screwing or twisting the components into place, optionally by use of a tandem adapter. Since the electrical wire must extend through much of the perforating gun assembly, it is easily twisted and crimped during assembly. In addition, when a wired detonator is used it must be manually connected to the electrical wire, which has lead to multiple problems. Due to the rotating assembly of parts, the wires can become torn, twisted and/or crimped/nicked, the wires may be inadvertently disconnected, or even mis-connected in error during assembly, not to mention the safety issues associated with physically and manually wiring live explosives.

According to the prior art and as shown in FIG. 1, the wired detonator 60 has typically been configured such that wires must be physically, manually connected upon configuration of the perforating gun assembly. As shown herein, the wired detonator 60 typically has three (or more or less) wires, which require manual, physical connection once the wired detonator is placed into the perforating gun assembly. For detonators with a wired integrated switch for selective perforating, the wires typically include at least a signal-in wire 61, a signal-out wire 62 and a ground wire 63. In a typical manual, physical connection, the wires extending along the perforating gun are matched to the wires of the detonator, and an inner metallic portion of one wire is twisted together with an inner metallic portion of the matched wire using an electrical connector cap 64 or wire nut or a scotch-lock type connector.

What is needed is a detonator positioning device capable of positioning a wireless detonator including a spring-contact, single wire (not two or more wires as described above) connection within a perforating gun assembly, particularly a typical perforating gun assembly that has traditionally used a fully-wired detonator.

BRIEF DESCRIPTION

An embodiment provides a detonator positioning device for positioning a detonator in a perforating gun assembly. In an embodiment, the detonator positioning device is formed of a multi-part cylindrical body.

Another embodiment provides a perforating gun assembly including the detonator positioning device for positioning a wireless detonator.

Another embodiment provides a method of assembling the perforating gun assembly including a detonator positioning device and a detonator.

BRIEF DESCRIPTION OF THE FIGURES

A more particular description will be rendered by reference to specific embodiments thereof that are illustrated in the appended drawings. Understanding that these drawings depict only typical embodiments and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to embodiments.

DETAILED DESCRIPTION

Reference will now be made in detail to various embodiments. Each example is provided by way of explanation, and is not meant as a limitation and does not constitute a definition of all possible embodiments.

A detonator is provided that is capable of being positioned or placed into a perforating gun assembly with minimal effort by means of placement/positioning within a detonator positioning device according to an aspect. In an embodiment, the detonator positioning device includes a detonator positioned within the detonator positioning device, wherein the detonator electrically contactably forms an electrical connection with minimal need to manually and physically connect, cut or crimp multiple wires as required in a fully wired electrical connection. Such a wireless detonator has been generally described in commonly assigned DE Application No. 102013109227.6 filed Aug. 26, 2013, which is incorporated herein by reference in its entirety. In other words, the electrical connection is made only by making electrical contact with electrically contactable components as described in greater detail hereinbelow . . . that is by merely physically touching. Thus, as used herein, the term "wireless" means that the detonator itself is not manually, physically connected within the perforating gun assembly as has been traditionally done with wired connections, but rather merely makes electrical contact through various components as described herein to form the electrical connections. Thus, the signal is not being wirelessly transmitted, but is rather being relayed through electrical cables/wiring within the perforating gun assembly through the electrical contacts. In particular, the electrical connection is made through contact between a line-in contact-initiating pin 38 and a line-in portion 20 as described in greater detail below.

Figure 1:
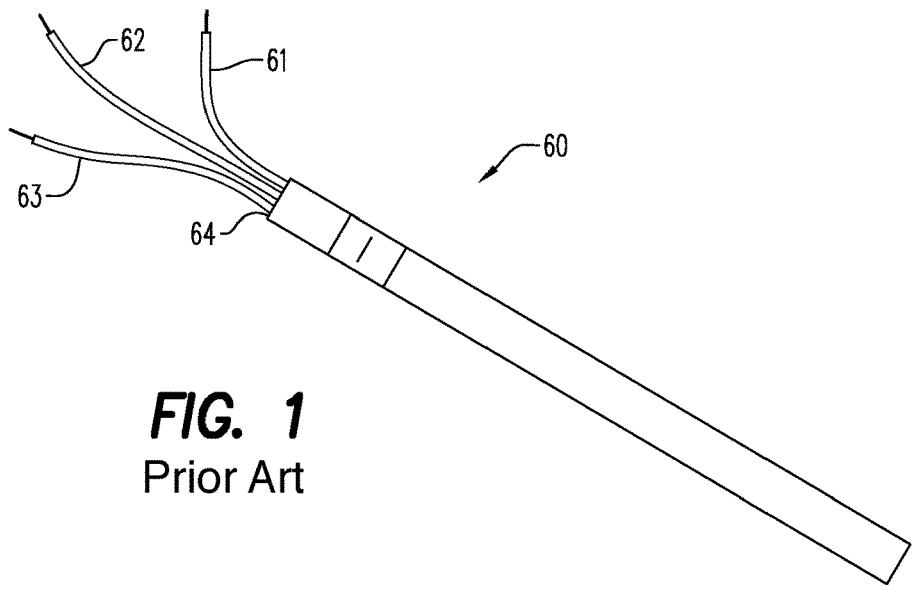
FIG. 1 is a perspective view of a wired detonator according to the prior art.
Figure 2:
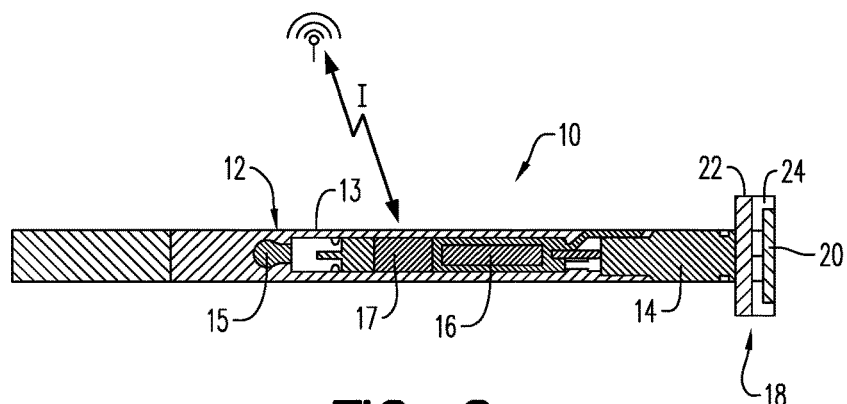
FIG. 2 is a cross-sectional side view of a wireless detonator useful with a detonator positioning device according to an embodiment.
Figure 3:
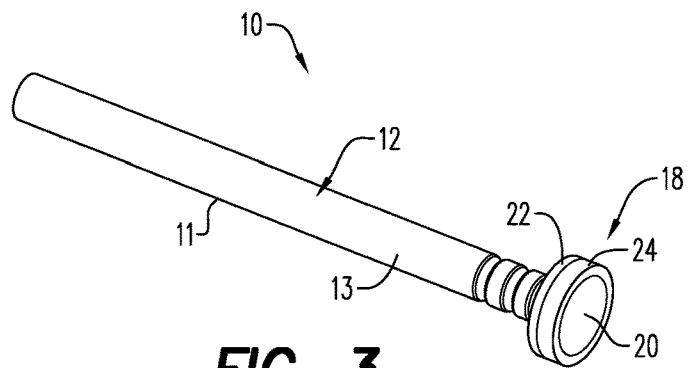
FIG. 3 is a perspective view of the detonator according to FIG. 2.

Now referring to FIGS. 2 and 3 such a detonator 10 incudes a detonator shell 12 and a detonator head 18 and is configured for being electrically contactably received within a perforating gun assembly 40 (see, for instance, FIG. 4) without using a wired electrical connection directly to the detonator. Rather, a single line-out wire (not shown) is connected to the detonator positioning assembly as described in more detail hereinbelow.

Only a portion of the perforating gun assembly 40 is depicted herein, including a perforating gun body or barrel or carrier or housing 42 for housing the various components of the assembly. Also shown is a distal end of a typical tandem seal adapter or tandem sub 44, in which a bulkhead assembly 46 is shown assembled within the perforating gun assembly 40. The tandem sub 44 is configured to seal inner components within the perforating gun housing 42 from the outside environment using sealing means. The tandem seal adapter 44 seals adjacent perforating gun assemblies (not shown) from each other, and houses the bulkhead assembly 46.

Figure 4:
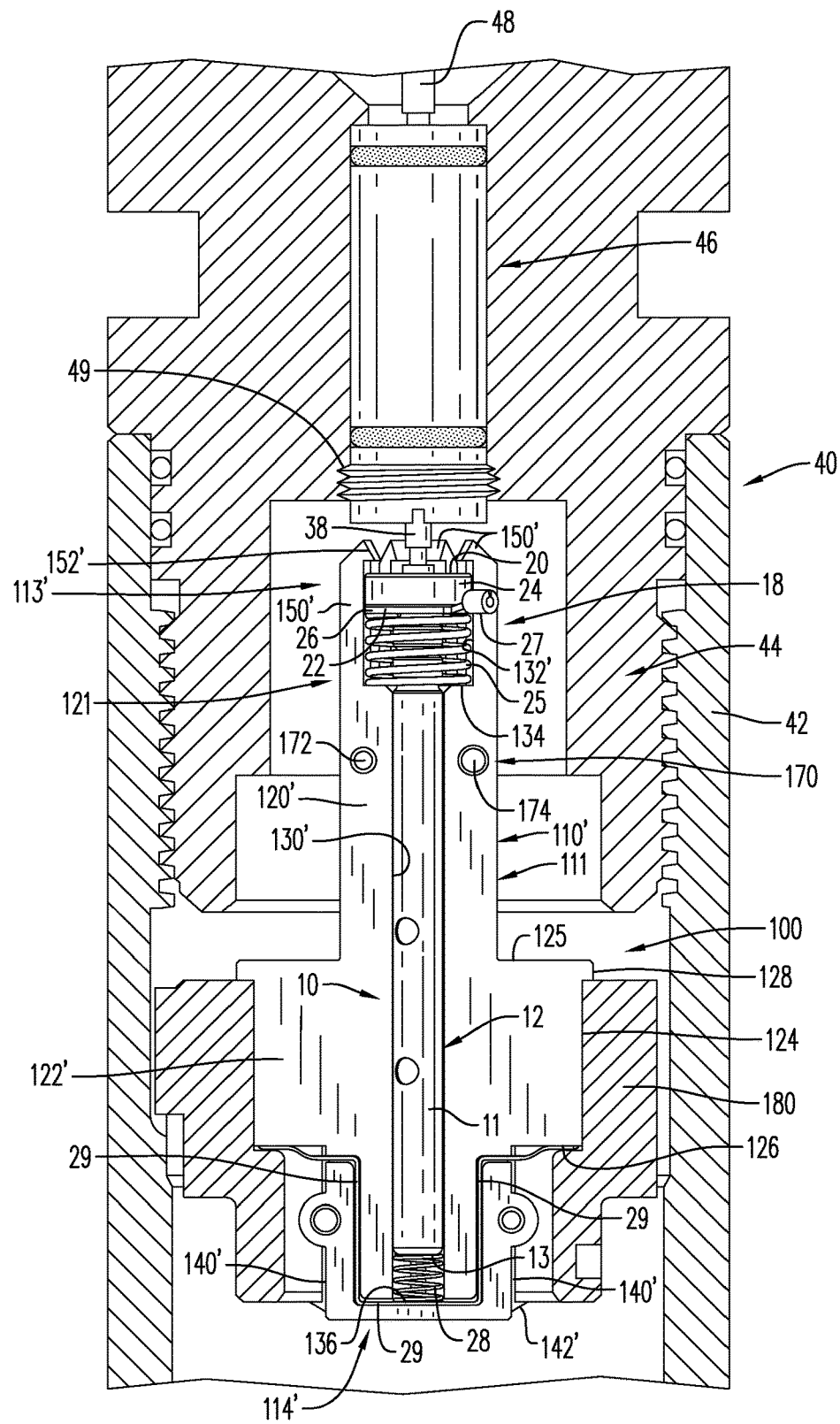
FIG. 4 is a partial semi-cross-sectional side perspective view of a perforating gun assembly including the detonator of FIGS. 2-3 seated within a detonator positioning device in which the detonator positioning device includes a multi-part cylindrical body according to an embodiment.
Figure 5:
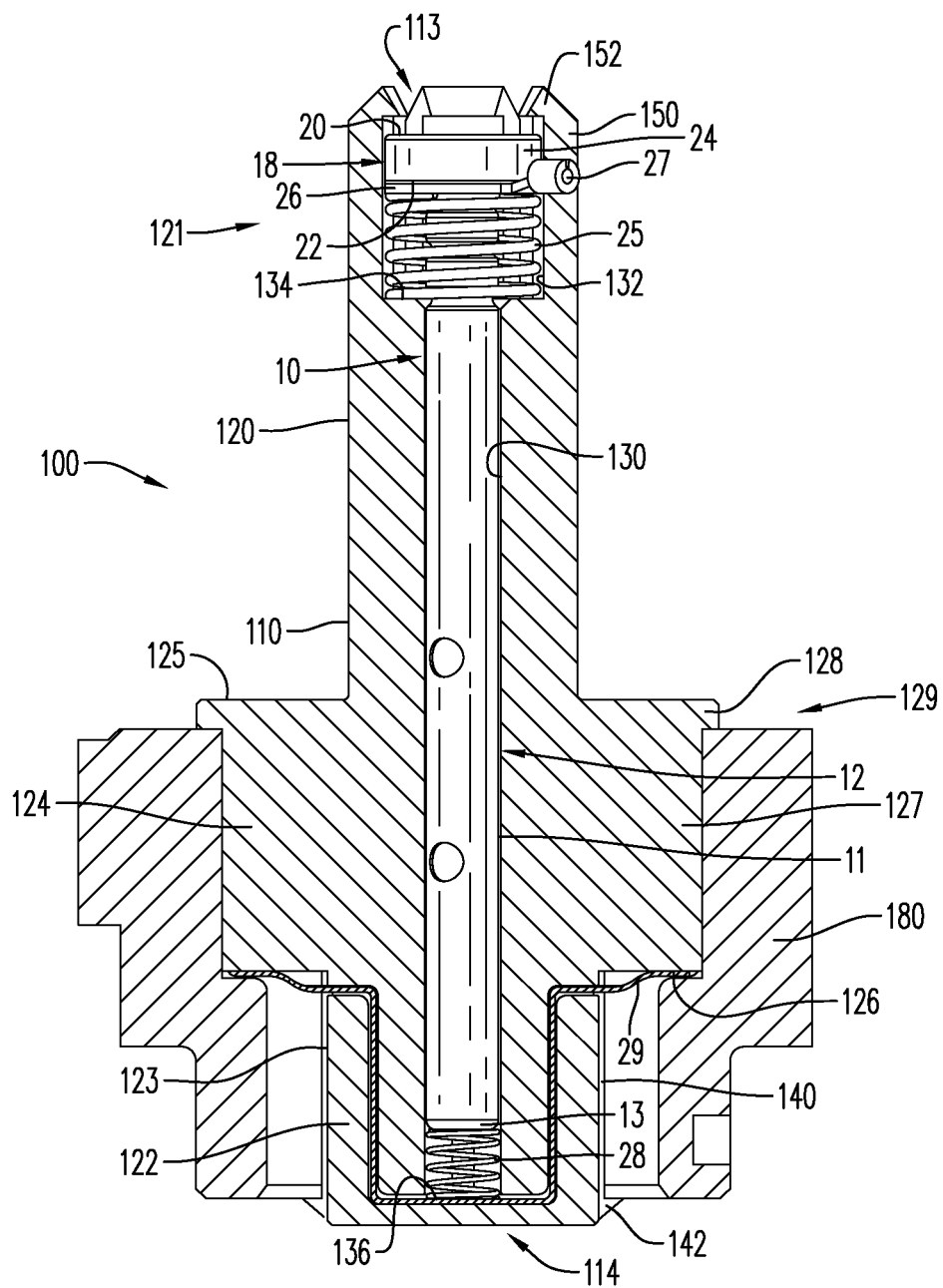
FIG. 5 is a cross-sectional side view of the detonator positioning device formed as a unitary member according to an embodiment.
Figure 10:
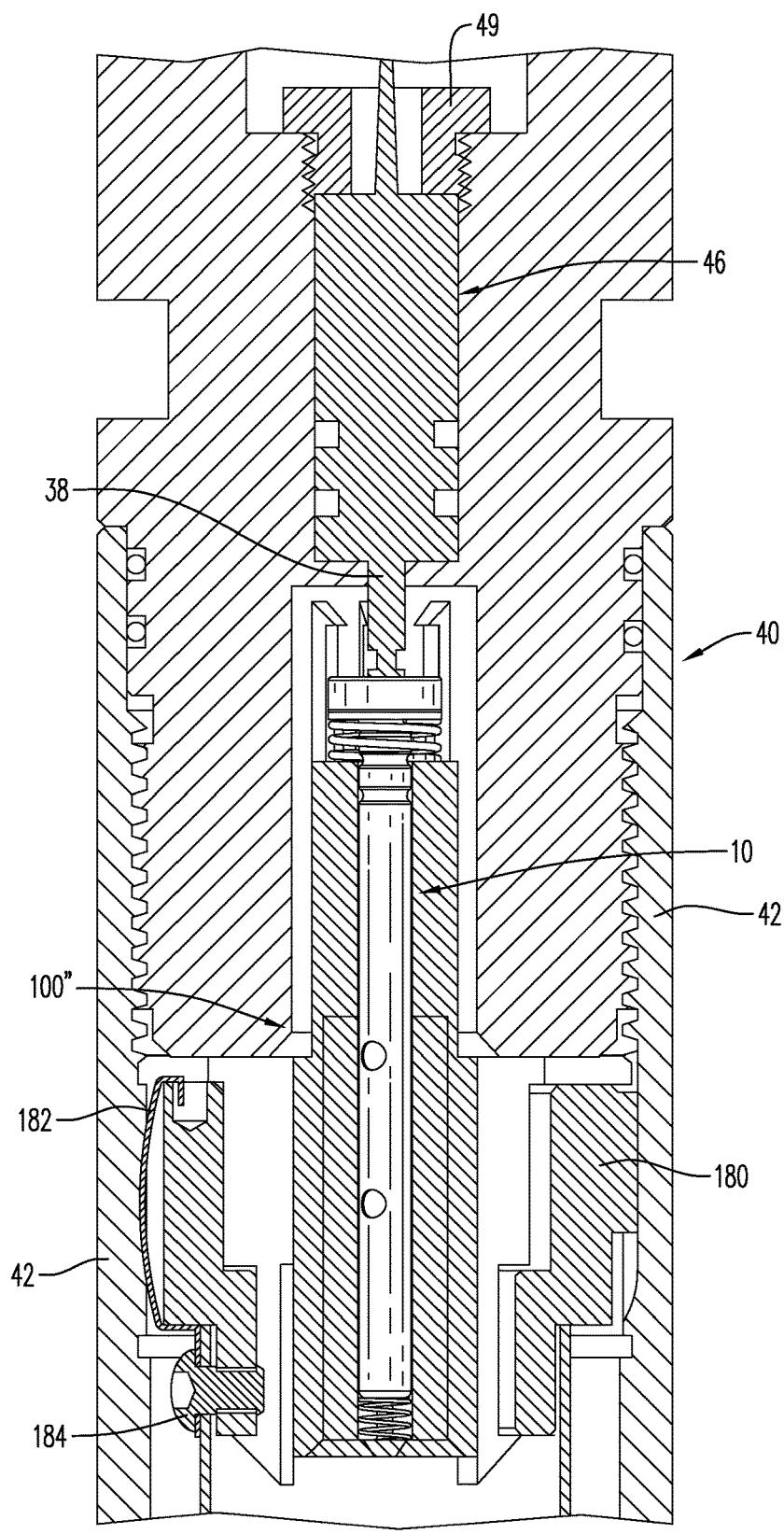
FIG. 10 is a partial cross-sectional view of another embodiment of the detonator positioning device assembly within a perforating gun assembly.

The bulkhead assembly 46 functions to relay a line-in contact-initiating pin 38 for wirelessly electrically contacting a line-in portion 20 of the detonator head 18 as described in greater detail hereinbelow. As shown in FIG. 4, for instance, bulkhead wires 48 are depicted with a coating or insulating member, typically using heat shrinking, over the wires 48 for supplying current to the bulkhead assembly 46. With reference to FIGS. 4 and 10, a bulkhead retaining mechanism 49 is provided to secure the bulkhead assembly 46 within the tandem sub 44. In the embodiment of FIG. 4, the retaining mechanism 49 abuts the end of the bulkhead assembly 46 from which the line-in contact-initiating pin 38 extends, while in the embodiment depicted in FIG. 10, the retaining mechanism 49 abuts the opposite end of the bulkhead assembly 46.

The detonator shell 12 of the detonator 10 useful herein is configured as a housing or casing 11, typically a metallic housing, which houses at least a detonator head plug 14, a fuse head 15, an electronic circuit board 16 and explosive components. The fuse head 15 could be any device capable of converting an electric signal into an explosion. As shown in FIG. 2, the detonator shell 12 is shaped as a hollow cylinder. The electronic circuit board 16 is connected to the fuse head 15 and is configured to allow for selective detonation of the detonator 10. The electronic circuit board 16 is configured to wirelessly and selectively receive an ignition signal I, (typically a digital code uniquely configured for a specific detonator), to fire the perforating gun assembly 40. By "selective" what is meant is that the detonator 10 is configured to receive one or more specific digital sequence(s), which differs from a digital sequence that might be used to arm and/or detonate another detonator in a different, adjacent perforating gun assembly, for instance, a train of perforating gun assemblies. So, detonation of the various assemblies does not necessarily have to occur in a specified sequence. Any specific assembly can be selectively detonated. In an embodiment, the detonation occurs in a bottom-up sequence.

The detonator head 18 extends from one end of the detonator shell 12, and includes more than one electrical contacting component including an electrically contactable line-in portion 20 and an electrically contactable line-out portion 22. According to one embodiment, the detonator head 18 may also include an electrically contactable ground portion 13 (not shown). In an embodiment, the detonator head 18 may be disk-shaped. In another embodiment, at least a portion of the detonator housing 11 is configured as the ground portion 13. The line-in portion 20, the line-out portion 22 and the ground portion 13 are configured to replace the wired connection of the prior art wired detonator 60 and to complete the electrical connection merely by contact with other electrical contacting components. In this way, the line-in portion 20 of the detonator 10 replaces the signal-in wire 61 of the wired detonator 60, the line-out portion 22 replaces the signal-out wire 60 and the ground portion 13 replaces the ground wire 63. Thus, when placed into a detonator positioning device 100 (see, for instance, FIG. 4) as discussed in greater detail below, the line-in portion 20, the line-out portion 22 and the ground portion 13 make an electrical connection by merely making contact with corresponding electrical contacting components (also as discussed in greater detail below). That is, the detonator 10 is wirelessly connectable only by making and maintaining electrical contact of the electrical contacting components to replace the wired electrical connection and without using a wired electrical connection.

The detonator head 18 also includes an insulator 24, which is positioned between the line-in portion 20 and the line-out portion 22. The insulator 24 functions to electrically isolate the line-in portion 20 from the line-out portion 22. Insulation may also be positioned between other lines of the detonator head. As discussed above and in an embodiment, it is possible for all of the contacts to be configured as part of the detonator head 18 (not shown), as found, for instance, in a banana connector used in a headphone wire assembly in which the contacts are stacked longitudinally along a central axis of the connector, with the insulating portion situated between them.

In an embodiment, a capacitor 17 is positioned or otherwise assembled as part of the electronic circuit board 16. The capacitor 17 is configured to be discharged to initiate the detonator 10 upon receipt of a digital firing sequence via the ignition signal I, the ignition signal being electrically relayed directly through the line-in portion 20 and the line-out portion 22 of the detonator head 18. In a typical arrangement, a first digital code is transmitted down-hole to and received by the electronic circuit board. Once it is confirmed that the first digital code is the correct code for that specific detonator, an electronic gate is closed and the capacitor is charged. Then, as a safety feature, a second digital code is transmitted to and received by the electronic circuit board. The second digital code, which is also confirmed as the proper code for the particular detonator, closes a second gate, which in turn discharges the capacitor via the fuse head to initiate the detonation.

In an embodiment, the detonator 10 may be fluid disabled. "Fluid disabled" means that if the perforating gun has a leak and fluid enters the gun system then the detonator is disabled by the presence of the fluid and hence the explosive train is broken. This prevents a perforating gun from splitting open inside a well if it has a leak and plugging the wellbore, as the hardware would burst open. In an embodiment, the detonator 10 is a selective fluid disabled electronic (SFDE) detonator.

The detonator 10 according to an embodiment can be either an electric or an electronic detonator. In an electric detonator, a direct wire from the surface is electrically contactingly connected to the detonator and power is increased to directly initiate the fuse head. In an electronic detonator, circuitry of the electronic circuit board within the detonator is used to initiate the fuse head.

The detonator 10 may be immune to stray current or voltage and/or radiofrequency (RF) signals to avoid inadvertent firing of the perforating gun. Thus, the assembly is provided with means for ensuring immunity to stray current or voltage and/or RF signals, such that the detonator 10 is not initiated through random radio frequency signals, stray voltage or stray current. In other words, the detonator 10 is configured to avoid unintended initiation.

The detonator 10 is configured to be electrically contactingly received within the detonator positioning device 100, which is seated or positioned within the perforating gun assembly 40, without using a wired electrical connection to the detonator 10 itself, as shown in FIGS. 4, 5, 7-9 and 10.

Figure 6:
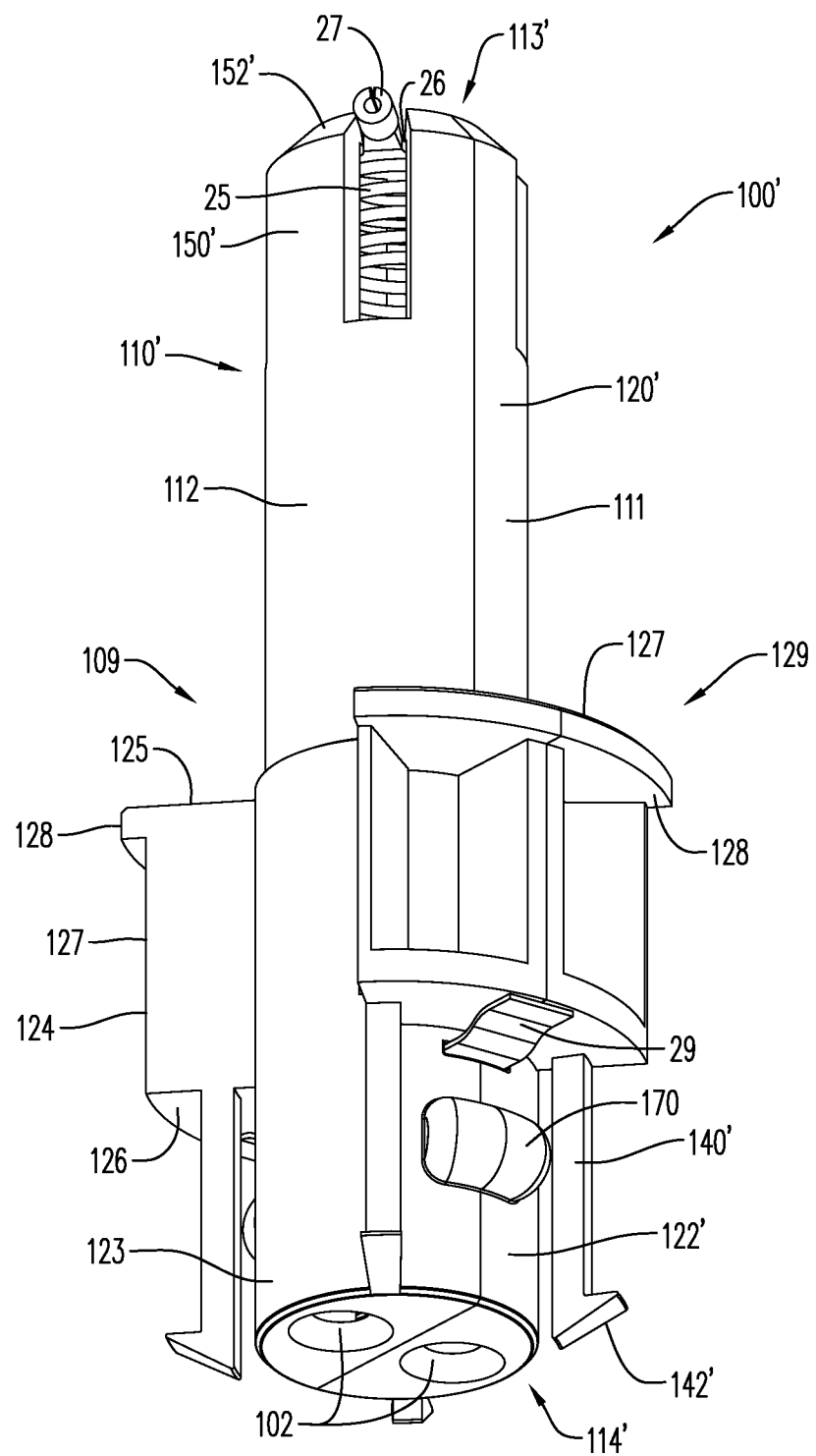
FIG. 6 is a perspective view of the detonator positioning device including a multi-part cylindrical body of FIG. 4 according to an embodiment.
Figure 7:
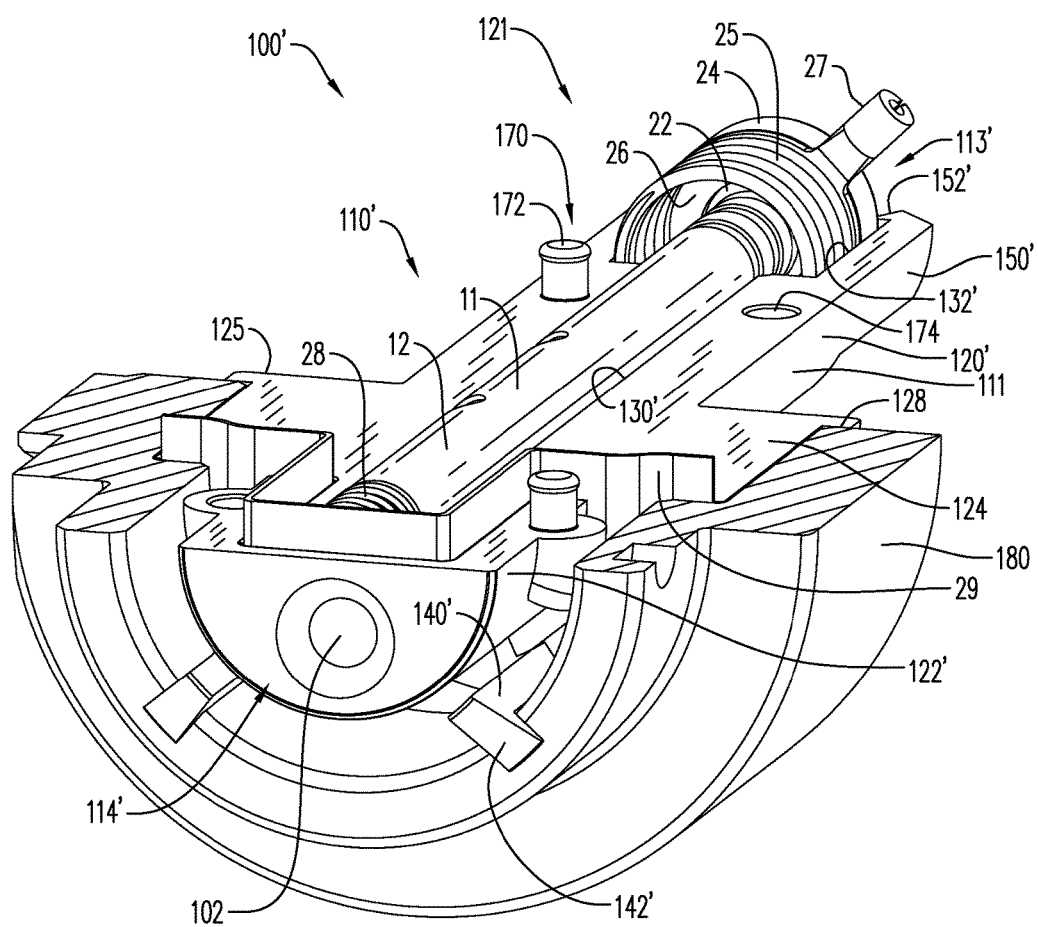
FIG. 7 is a perspective view of one part of the detonator positioning device of FIG. 6 positioned within an end plate according to an embodiment.
Figure 8:
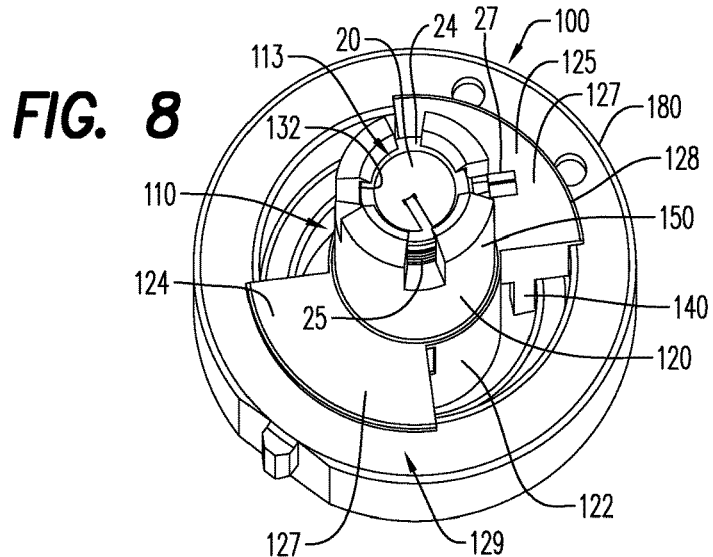
FIG. 8 is a forward end perspective view of the detonator positioning device according to an embodiment.
Figure 9:
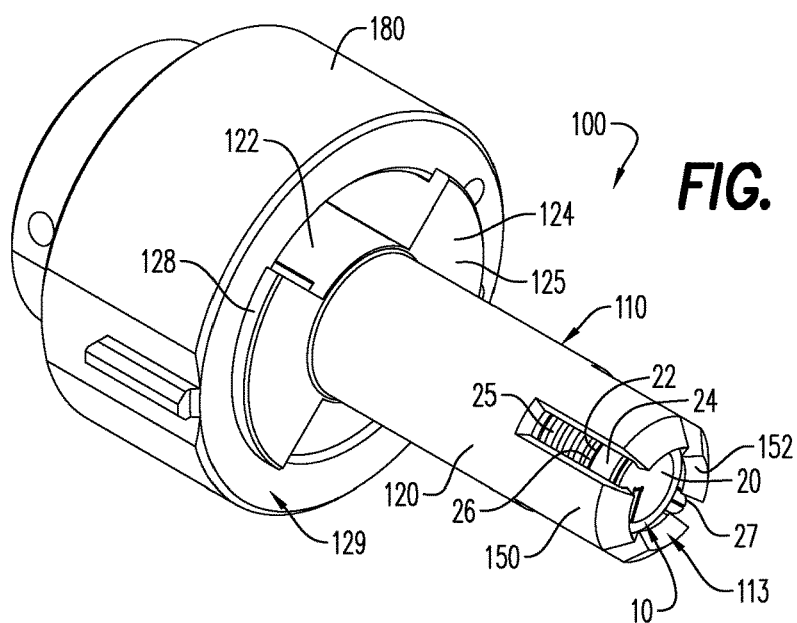
FIG. 9 is another perspective view of the detonator positioning device tilted at an angle from FIG. 8 according to an embodiment.

In an embodiment and as shown in FIGS. 4, 6 and 7, the detonator positioning device 100 includes a cylindrical body 110' depicted as a multi-part member, that is a body that is formed using a plurality of parts or sections, which may facilitate ease of assembly. With reference to the embodiment of FIG. 5, the cylindrical body 110 may also be provided as a unitary body, one that is formed as a whole, for instance by machining or molding processes known by those of ordinary skill in the art. As used herein, the prime symbol ' in the various figures designates the difference between embodiments of the unitary body (no prime used) as compared to features of the multi-part body (prime used), and will not generally be used in the description. As an example, with reference to a central bore 130, the central bore will be depicted as central bore 130' in the embodiment wherein multiple parts are used to form the body 110', while the central bore 130 (without the prime) will be used to depict the bore of the unitary body 100. In an embodiment and with reference to, for instance, FIG. 7, one or more passages 102 are provided in the closed end of the cylindrical body 110 to accommodate passage of a detonating cord (not shown) positioned within the detonator positioning device 100.

With reference again in particular to FIGS. 4-9, the cylindrical body 110 includes an open end 113, a closed end 114, and a central bore 130 adapted for receiving the detonator 10. The cylindrical body 110 also includes a plurality of portions, including at least a first portion 120 and a second portion 122, and in an embodiment a third portion 124, which will be discussed in greater detail below. The central bore 130 extends along at least some of a length of the cylindrical body 110, and typically includes an enlarged bore portion 132 adjacent the open end 113 of the cylindrical body 110. The enlarged bore portion 132 is adapted to receive the head 18 portion of the detonator 10, while the central bore 130 is adapted to receive the housing 11 portion of the detonator 10. In an embodiment, the enlarged bore portion 132 is positioned within the first portion 120 of the cylindrical body 110 and the central bore 130 extends along a majority of the length of the cylindrical body 110. In an embodiment, the enlarged bore portion 132 and the detonator head 18 are complementarily sized and shaped to receive and seat/be received and seated, respectively, in at least a semi-fixed position within the detonator positioning device 100.

In an embodiment, a plurality of arms 150 extend toward the open end 113 of the cylindrical body 110 and at least partially enclose the enlarged bore portion 132 of the central bore 130. In this way, each of the plurality of arms 150 is adapted to retain, hold or otherwise embrace the detonator head 18 portion of the detonator 10 when the detonator 10 is positioned within the enlarged bore portion 132 of the central bore 130. Typically, the arms 150 are made of a flexible and resilient material that is capable of being bent or otherwise moved circumferentially outward, yet return to their original position once the movement force has been removed, (e.g. once the detonator is positioned within the detonator positioning device 100). Thus, the arms 150 will enclose and typically contact at least a peripheral surface of the head 18 of the detonator 10. Although the plurality of arms 150 are depicted as having four arms, it would be understood that more or less arms may be sufficient to perform the stated function, i.e., to retain the detonator head. For instance, the plurality of arms 150 could include 2, 3, 4, 5, 6, 7, 8 or more arms. As shown in FIGS. 4-9 and in an embodiment, the arms may include a retainer 152 positioned at a distal end of the arms to assist in retaining and maintaining the head 18 of the detonator 10 within the detonator positioning device 100. As shown herein, the detonator head 18 is slidably received within the enlarged bore portion 132, meaning the detonator head 18 is capable of sliding along at least a portion of the length of the enlarged bore portion 132 created by the arms 150. In an embodiment, the plurality of arms 150 form at least a portion of a forward end 121 of the first portion 120 of the cylindrical body 110.

Although not shown, it is possible to provide a window or opening in the cylindrical body 110 of the detonator positioning device 100 to facilitate visual verification of proper seating of the detonating cord (not shown), once the detonating cord has been connected to the assembly through the passage 102.

Turning to the other end of the detonator positioning device 100, a plurality of legs 140 are adapted to assist in positioning the device 100 within the perforating gun assembly 40. In the embodiment shown in FIGS. 4-8, the plurality of legs 140 extend from the cylindrical body 110 toward the closed end 114 of the cylindrical body 110. Similar to the arms 150, the legs 140 may be made from a resilient material, and typically include protrusions 142 at the distal ends thereof adapted for positioning and holding the device 100 in place. In an embodiment, each protrusion 142 extends away from the cylindrical body 110.

Although the plurality of legs 140 are depicted as having four legs, it would be understood that more or less legs may be sufficient to perform the stated function, i.e., to position the detonator positioning device within a perforating gun assembly. For instance, the plurality of legs 140 could comprise 3, 4, 5, 6, 7, 8 or more legs. Having more legs (or arms as referenced above) means each individual leg/arm is ultimately thinner than if fewer legs/arms are used. Similarly, thinner legs/arms means the individual legs/arms are less rigid, so there will ultimately be a trade-off in number of legs/arms selected between rigidity and/or flexibility of the detonator positioning device and the ability to stabilize the detonator positioning device within the perforating gun assembly and/or retain the detonator head, as the case may be.

Further, in an embodiment, each of the plurality of arms 150 and the plurality of legs 140 are adapted to provide a snap fit upon insertion of the detonator 10 within the central bore 130 and insertion of the cylindrical body 110 within the perforating gun assembly 40.

As mentioned above, a third portion 124 may also be formed as a portion of the cylindrical body 110. As shown in FIGS. 4-9 and in an embodiment, the third portion 124 is formed integrally as part of the second portion 122, while it is contemplated that the third portion 124 could be formed as a separate unit that is attached to the cylindrically body 110. The third portion 124 has a forward face 125 and a rearward face 126, and as shown in this embodiment, the plurality of legs 140 extend from the rearward face 126 of the third portion 124. As depicted herein, the third portion 124, extends circumferentially from an outer surface 123 of the second portion 122 and the third portion 124 is discontinuous about the outer surface 123 of the second portion 122 of the cylindrical body 110, thus forming a plurality of sections 127. Such an arrangement typically minimized overall weight and associated costs with fabricating the unit, while maintaining sufficient structural integrity to perform the stated functions. Further as depicted in this embodiment, the third portion 124 includes a circumferentially-extending lip 128 at a distal end 129 of the third portion 124. In this arrangement, the distal end 129 is positioned opposite the plurality of legs 140. The lip 128 is further adapted for positioning the detonator positioning device 100 by working in concert with the plurality of legs 140 to hold the detonator positioning device 100 in place within the perforating gun assembly 40.

As stated above, the central bore 130 is adapted to receive and retain the detonator 10, wherein the central bore 130 extends from the open end 113 to the closed end 114 of the cylindrical body 110, and the enlarged bore portion 132 is positioned adjacent the open end 113. Thus, when the detonator 10 is positioned within the central bore 110 of the detonator positioning device 100, the detonator housing 11 extends along a length of the central bore 130, while the detonator head 18 is received within the enlarged bore portion 132.

In an embodiment, a line-out connector biasing member 25 is positioned or otherwise situated within the central bore 130 of the cylindrical body 110, at a base 134 of the enlarged bore portion 132, while a ground connector biasing member 28 is positioned or otherwise situated within the central bore 130 of the cylindrical body 110, at a base 136 of the central bore 130. Thus, the ground connector biasing member 28 is positioned within the central bore 130 between the detonator housing 11 of the detonator 10 and the closed end 114 of the cylindrical body 110. In addition, a terminal 26 is typically positioned adjacent the line-out connector biasing member 25.

In an embodiment, the terminal 26 is formed as a semi-round metallic material, with a slotted nipple 27 extending from an outer circumferential surface of the terminal 26. The slotted nipple 27 is adapted for connection to the single electrical line-out wire needed to complete the electrical connection for this assembly (not shown). Although a slotted nipple 27 is depicted, it will be understood by those of ordinary skill in the art that other mechanisms may be provided to create the electrical connection between the single wire and the terminal 26.

The line-out connector biasing member 25 and the ground connector biasing member 28 may be formed from a spring-like material for assisting in maintenance of physical and electrical contact between the line-in contact-initiating pin 38 extending from the bulkhead assembly 46, and may also be formed of materials suitable to facilitate electrical connectivity. Typically, these components are also metallic, that is to say they are formed from an electrically conductive metal material.

Once received within the central bore 130, therefore, the detonator 10 is electrically contactingly connected to the terminal 26 that is positioned between the line-out portion 22 of the detonating head 18 of the detonator 10 and the line-out connector biasing member 25. Thus, once the detonator 10 is positioned within the central bore 130, and the line-in contact-initiating pin 38 of the bulkhead assembly 46 makes contact with, and thus electrically contactably connects to the line-in portion 20 of the detonator head 18. The line-out connector biasing member 25 will thus compress, causing the line-out portion 22 of the detonator head 18 to electrically contactably connect with the terminal 26. The grounding connection will be discussed in more detail hereinbelow.

With reference to the closed end 114 of the detonator positioning device 100 and in an embodiment, a grounding strip or wire 29 is provided for completing the electrical connection and is also typically formed from an electrically conductive metal material. In an embodiment, the grounding strip 29 is embedded in the closed end 114 of the cylindrical body 110. As shown in the embodiment of FIGS. 4-7, the grounding strip 29 extends from one side of the cylindrical body 110 through to the opposite side of the cylindrical body 110 in a way that a central portion of the grounding strip 29 is positioned adjacent one end of the ground connector biasing member 28, opposite from the housing 11 of the detonator 10. Thus, the ends of the grounding strip 29 extend beyond the outer surface of the cylindrical body 110. When the detonator 10 is positioned within the central bore 130 of the detonator positioning device 100, and the detonator 10 is compressed by the contact of the bulkhead assembly 44, the ground connector biasing member 28 compresses and electrically contactably connects the ground portion 13 of the housing 11 with the ground connector biasing member 28 and the grounding strip 29, which completes a ground loop via connection with the perforating gun housing 42. As shown in FIG. 4, the grounding strip is deformed upon insertion of the detonator positioning device 100 into an end plate 180, the entire assembly of which is inserted within the perforating gun body 42, thus completing the ground loop/connection.

As mentioned above, and with particular reference to FIGS. 4, 6 and 7, the cylindrical body 110 may be formed as a multi-part cylindrical body 110' including at least a first part 111 and a second part 112. As shown herein, the first part 111 of the cylindrical body 110 can be removably connected, (or otherwise joined, fastened, united) to the second part 112 of the cylindrical body 110' to form an assembled cylindrical body 109. In this way, each of the first part 111 and the second part 112 include at least a first portion 120' and a second portion 122', the assembled cylindrical body 109 comprising an open end 113', a closed end 114', and a central bore 130' adapted for receiving the detonator 10, the central bore 130' extending along at least some of a length of the assembled cylindrical body 109, the central bore 130' including an enlarged bore portion 132' adjacent the open end 113' of the assembled cylindrical body 109. In this embodiment, a plurality of arms 150' extend toward the open end 113' of the assembled cylindrical body 109 and at least partially enclose the enlarged bore portion 132' of the central bore 130'. Further, each of the plurality of arms 150' include a retainer 152' adapted to retain the detonator head 18 of the detonator 10 positioned within the enlarged bore portion 132' of the central bore 130'. In an embodiment, a plurality of legs 140' extend from the assembled cylindrical body 109 and toward the closed end 114' of the assembled cylindrical body 109, and each of the plurality of legs 140' include a protrusion 142' extending away from the assembled cylindrical body 109 and adapted for positioning the assembled cylindrical body 109 in the perforating gun assembly 40.

Since the assembled cylindrical body 109 according to this embodiment requires assembly in the field, a plurality of couplers 170 are provided that are adapted for attaching the first part 111 of the assembled cylindrical body 109 to the second part 112 of the assembled cylindrical body 109. It would be understood by one of ordinary skill in the art that it is possible to attach the first part 111 to the second part 112 by any number of fasteners 172, including screws, bolts/nuts and the like that may be received in a socket or cavity 174 through threading, frictional fit and the like. As shown best in FIG. 7 and in an embodiment, the fastener 172 is a protrusion including a distal nob extending from the first part 111, which is matingly inserted into an oppositely positioned cavity 174 of the second part 112 (not shown). In an embodiment, the fastener 172 snap fits into the cavity 174.

In an embodiment, the first part 111 and the second part 112 may be configured as symmetrical or non-symmetrical halves.

According to an aspect the perforating gun assembly 40 and a method for assembling the perforating gun assembly 40 including a wireless detonator 10 and detonator positioning device 100 as described hereinabove is provided.

In an aspect, the method of assembling the perforating gun assembly 40 while using a semi-wired electrical connection includes at least the following steps: positioning the detonator positioning device 100 within the perforating gun assembly 40, the detonator positioning device 100 including the central bore 130; positioning the ground connector biasing member 28 at the base 136 of the central bore 130; positioning the line-out connector biasing member 25 at the base 134 of the enlarged portion 132 of the central bore 130; positioning the terminal 26 for receiving the single line-out wire adjacent the line-out connector biasing member 25; positioning the wireless detonator 10 within the central bore 130 such that the housing 11 of the detonator 10 extends along at least a portion of the central bore 130 and the ground portion 13 of the housing 11 electrically contacts the ground connector biasing member 28, and positioning the head 18 of the detonator 10 within the enlarged portion 132 of central bore 130 such that the line-out portion 22 of the detonator 10 electrically contacts the terminal 26, and the line-in contact-initiating pin 38 electrically contacts the line-in portion 20 of the detonator 10.

According to an aspect, the step of positioning the detonator positioning device 100 within the perforating gun assembly 40 includes positioning the detonator positioning device within a support member or end plate 180, as seen, for instance, FIGS. 4, 5 and 7-10, and as discussed briefly above. As shown herein the end plate 180 has an inner cavity that is sufficiently sized to receive the closed end 114 of the cylindrical body 110, and in particular to receive at least the second portion 122 (and/or the third portion 124) by interlocking and/or snap-fit action with the plurality of legs 140 at a rearward end of the endplate 180 (see FIGS. 4, 5 and 7) and by abutting the circumferentially-extending lip against the outer surface of the end plate 180 (see in particular FIGS. 8 and 9) at the opposite end of the end plate 180. Similarly, the outer dimension or exterior surface of the end plate 180 is sufficiently sized to be received within the perforating gun barrel 42. Although not specifically shown, it will be understood by one of ordinary skill in the art that it is possible to form various members and components described herein as integrated units.

Figure 11:
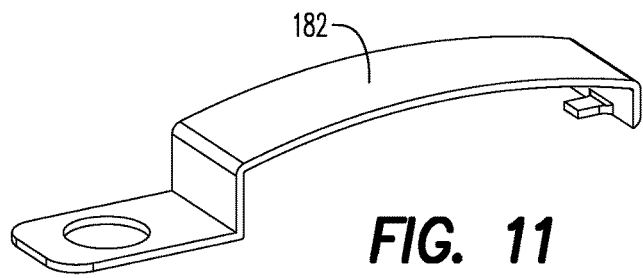
FIG. 11 is a perspective view of a ground rib according an embodiment.

Turning to the embodiment found in FIG. 10, a separate component is provided to facilitate the ground loop discussed hereinabove. As shown herein, a grounding rib 182 is attached to the exterior surface of the end plate 180 to complete the ground loop upon positioning of the detonator positioning device 100 within the perforating gun assembly 40. In an embodiment, the grounding rib 182 is formed as a long, narrow, thin, semi-curved, flexible and resilient, metallic member, as seen best in FIG. 11. As shown herein, a securing mechanism 184 is provided for attaching the grounding rib to the exterior surface of the end plate 180. Thus, when the assembly is inserted into the perforating gun barrel 42, the grounding rib is flexed circumferentially inwardly to complete the ground loop As used herein, "hold" means to enclose within bounds, to limit or hold back from movement or to keep in a certain position. The detonator positioning device 100 is positioned within the perforating gun assembly 40 and functions to receive and hold in place the detonator 10 according to an embodiment. In addition, the detonator positioning device 100 also functions to provide electrical contacting components for wirelessly-connectably electrically receiving the detonator 10, while providing for a single wired connection to the detonator positioning device 100 itself.

The components and methods illustrated are not limited to the specific embodiments described herein, but rather, features illustrated or described as part of one embodiment can be used on or in conjunction with other embodiments to yield yet a further embodiment. It is intended that the device and method include such modifications and variations. Further, steps described in the method may be utilized independently and separately from other steps described herein.

While the device and method have been described with reference to a preferred embodiment, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment," "some embodiments," "an embodiment" and the like are not intended to be interpreted as excluding the existence of additional embodiments that also incorporate the recited features. Terms such as "first," "second," "forward," "rearward," etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of."

Advances in science and technology may make equivalents and substitutions possible that are not now contemplated by reason of the imprecision of language; these variations should be covered by the appended claims. This written description uses examples to disclose the device and method, including the best mode, and also to enable any person of ordinary skill in the art to practice the device and method, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A detonator positioning device for positioning a wireless detonator in a perforating gun assembly, the device comprising:
    a cylindrical body comprising an open end, a closed end, and a central bore adapted for receiving the detonator, the central bore extending along at least some of a length of the cylindrical body, the central bore including an enlarged bore portion adjacent the open end of the cylindrical body;
    a plurality of arms extending toward the open end of the cylindrical body and at least partially enclosing the enlarged bore portion of the central bore, each of the plurality of arms adapted to retain a detonator head of the detonator when the detonator is positioned within the enlarged bore portion of the central bore; and
    a plurality of legs extending from the cylindrical body and toward the closed end of the cylindrical body, each of the plurality of legs adapted to position the cylindrical body in the perforating gun assembly.

2. The detonator positioning device of claim 1, further comprising:
    a line-out connector biasing member positioned within the central bore of the cylindrical body between the detonator head and a base of the enlarged bore portion;
    a terminal adapted for connecting a line-out wire, the terminal positioned between the detonator head and the line-out connector biasing member; and
    a ground connector biasing member positioned within the central bore between a detonator housing of the detonator and the closed end of the cylindrical body.

3. The detonator positioning device of claim 2, further comprising:
    a grounding strip embedded in the closed end of the cylindrical body, the grounding strip positioned in contact with the ground connector biasing member.

4. The detonator positioning device of claim 1, wherein each of the plurality of arms comprises a retainer adapted for the retaining of the detonator head, and each of the plurality of legs comprises a protrusion extending away from the cylindrical body and adapted for the positioning of the cylindrical body, wherein each of the plurality of arms and the plurality of legs are flexible such that insertion of the detonator within the central bore and insertion of the cylindrical body within the perforating gun assembly is accomplished with a snap fit.

5. The detonator positioning device of claim 1, wherein the cylindrical body, the plurality of arms, and the plurality of legs are made from plastic and formed as a unitary member.

6. The detonator positioning device of claim 1, wherein the cylindrical body further comprises:
    a first portion, wherein the plurality of arms form at least a portion of a forward end of the first portion;
    a second portion; and
    a third portion extending circumferentially from an outer surface of the second portion, the third portion having a forward face and a rearward face, and the plurality of legs extending from the rearward face of the third portion.

7. The detonator positioning device of claim 6, wherein the third portion is discontinuous about the outer surface of the second portion to form a plurality of sections.

8. The detonator positioning device of claim 6, wherein the enlarged bore portion is positioned within the first portion of the cylindrical body and the central bore extends along a majority of the length of the cylindrical body.

9. The detonator positioning device of claim 6, wherein the third portion comprises a circumferentially-extending lip at a distal end thereof, the distal end being positioned opposite the plurality of legs, the lip adapted for positioning the cylindrical body by working in concert with the plurality of legs to hold the cylindrical body in place within the perforating gun assembly.

10. The detonator positioning device of claim 1, wherein the cylindrical body is a multi-part cylindrical body, the-multi-part cylindrical body comprising at least a first part and a second part, wherein the first part is removably connected to the second part of the cylindrical body to form an assembled cylindrical body, each of the first part and the second part including at least a first portion and a second portion, and each of the plurality of legs comprising a protrusion extending away from the assembled cylindrical body and adapted for positioning the assembled cylindrical body in the perforating gun assembly.

11. The detonator positioning device of claim 10, further comprising:
a plurality of couplers adapted for attaching the first part of the assembled cylindrical body to the second part of the assembled cylindrical body.

12. The detonator positioning device of claim 10, wherein the first part and the second part are configured as symmetrical halves.

13. The detonator positioning device of claim 10, further comprising:
a line-out connector biasing member positioned within the central bore of the assembled cylindrical body between the detonator head and a base of the enlarged bore portion;
a terminal adapted for connecting a line-out wire, the terminal positioned between the detonator head and the line-out connector biasing member; and
a ground connector biasing member positioned within the central bore between a detonator housing of the detonator and the closed end of the assembled cylindrical body.

14. A perforating gun assembly comprising:
a perforating gun housing;
a wireless detonator; and
a detonator positioning device for positioning the perforating gun housing, the detonator positioning device comprising:
a multi-part cylindrical body comprising at least a first part and a second part, wherein the first part is removably connected to the second part of the cylindrical body to form an assembled cylindrical body, each of the first part and the second part including at least a first portion and a second portion, the assembled cylindrical body comprising an open end, a closed end, and a central bore adapted for receiving the detonator, the central bore extending along at least some of a length of the assembled cylindrical body, and the central bore including an enlarged bore portion adjacent the open end of the assembled cylindrical body,
a plurality of arms extending toward the open end of the assembled cylindrical body and at least partially enclosing the enlarged bore portion of the central bore, each of the plurality of arms comprising a retainer adapted to retain a detonator head of the detonator when positioned within the enlarged bore portion of the central bore, and
a plurality of legs extending from the assembled cylindrical body and toward the closed end of the assembled cylindrical body, each of the plurality of legs comprising a protrusion extending away the assembled cylindrical body and adapted for positioning the assembled cylindrical body in the perforating gun housing.

15. The perforating gun assembly of claim 14, further comprising a third portion extending circumferentially from an outer surface of the second portion, the third portion having a forward face and a rearward face, and the plurality of legs extending from the rearward face of the third portion.

16. The perforating gun assembly of claim 15, wherein the third portion is discontinuous about the outer surface of the second portion to form a plurality of sections.

* * * * *